(12) United States Patent
Durante et al.

(10) Patent No.: US 11,966,314 B2
(45) Date of Patent: Apr. 23, 2024

(54) METHOD AND APPARATUS FOR CONTROLLING LED OPERATION OF A STORAGE SYSTEM (71) Applicant: Bretford Manufacturing, Inc., Franklin Park, IL (US)

(72) Inventors: Caleb Durante, Oak Park, IL (US); Hubert Benjamin Ki Durn Ng, Park Ridge, IL (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 15 days.

(21) Appl. No.: 17/950,676

(22) Filed: Sep. 22, 2022

(65) Prior Publication Data

US 2023/0026803 A1 Jan. 26, 2023

Related U.S. Application Data (62) Division of application No. 16/852,429, filed on Apr. 18, 2020, now Pat. No. 11,481,303.

(Continued)

(51) Int. Cl.
| | |
|---|---|
| G06F 11/32 | (2006.01) |
| G01K 3/00 | (2006.01) |
| G05B 13/02 | (2006.01) |
| G05B 19/4155 | (2006.01) |
| G06F 1/20 | (2006.01) |
| G06F 11/30 | (2006.01) |
| G06F 13/42 | (2006.01) |

(Continued)

(52) U.S. Cl.
CPC ............ *G06F 11/325* (2013.01); *G01K 3/005* (2013.01); *G05B 13/0265* (2013.01); *G05B 19/4155* (2013.01); *G06F 1/206* (2013.01); *G06F 11/3034* (2013.01); *G06F 11/3058* (2013.01); *G06F 13/4282* (2013.01); *H05B 45/10* (2020.01); *H05B 45/20* (2020.01); *G05B 2219/49216* (2013.01); *G06F 2200/201* (2013.01); *G06F 2213/0042* (2013.01)

(58) Field of Classification Search
CPC ..... G01K 3/005; G06F 1/206; G06F 11/3034; G06F 2201/81
See application file for complete search history.

(56) References Cited

U.S. PATENT DOCUMENTS

| | | | |
|---|---|---|---|
| 10,156,987 B1 * | 12/2018 | Gutierrez | G06F 1/3268 |
| 2009/0096336 A1 * | 4/2009 | Petrick | G11B 33/126 |
| | | | 312/249.8 |

(Continued)

*Primary Examiner* — Vincent H Tran
(74) *Attorney, Agent, or Firm* — Anderson Gorecki LLP (57) ABSTRACT LED operation rules correlating device event, LED action, LED color, and optionally LED brightness are specified in software. As devices connect to a host computer, a correlation between device ID and USB port is detected. A port map for the storage system is used to correlate the location of a USB port where the electronic device connected to a set of LEDs on the storage system. As the states of the electronic devices connected to the storage system change, the custom-defined LED operational rules are applied on the LEDs of the storage system to cause the LEDs identified by the LED operational rules to be illuminated. Since the LED operational rules are customizable, a user can cause any combination of LED action, color, and brightness to be associated with any electronic device state.

4 Claims, 9 Drawing Sheets

Related U.S. Application Data

(60) Provisional application No. 62/835,842, filed on Apr. 18, 2019.

(51) Int. Cl.
  *H05B 45/10* (2020.01)
  *H05B 45/20* (2020.01)

(56) References Cited

U.S. PATENT DOCUMENTS

| | | | |
|---|---|---|---|
| 2015/0088333 A1* | 3/2015 | Delano | G01J 5/0003 700/300 |
| 2015/0323940 A1* | 11/2015 | Venkatesan | G05D 23/1917 700/300 |
| 2017/0257079 A1* | 9/2017 | Jain | G06F 1/3234 |
| 2019/0011965 A1* | 1/2019 | Seyed | G06F 1/206 |
| 2019/0132277 A1* | 5/2019 | Keshava | H04L 61/5007 |
| 2021/0382803 A1* | 12/2021 | Zeng | G06F 1/3206 |

\* cited by examiner

Menu Bar

| Preset Tab | State Tab | Action Tab | Color Tab | Brightness Tab |

Custom #1

LED Operation Rules 135:

| | Device State | Action | Color | Brightness |
|---|---|---|---|---|
| Rule 1: | Device Connected | Turn LED on for 8 seconds | Orange | Ramp UP (over 8 seconds) |
| Rule 2: | Device Charging | Turn LED on | Red | Base on current thresholds |
| Rule 3: | Device Charged | Turn LED on | Green | Uniform brightness |
| Rule 4: | Device Disconnected | Turn LED on for 8 seconds | Red | Ramp Down (over 8 seconds) |
| Rule 5: | Sync started | Blink LED – short blink | Green | Uniform brightness |
| Rule 6: | Sync stopped | Blink LED – long blink interval | Green | Ramp Down (over 9 seconds) |
| Rule 7: | Over Temperature | Blink LED – long blink interval | Red, Blue, Green, Orange | Uniform brightness |
| Rule 8: | Storage System power ON | Turn LED on | Blue | Uniform brightness |

FIG. 10

METHOD AND APPARATUS FOR CONTROLLING LED OPERATION OF A STORAGE SYSTEM

CROSS-REFERENCE TO RELATED APPLICATIONS

This application is a divisional application of U.S. patent application Ser. No. 16/852,429, filed Apr. 18, 2020, which claims priority to U.S. Provisional Patent Application No. 62/835,842, filed Apr. 18, 2019, the content of which is hereby incorporated herein by reference.

BACKGROUND

This disclosure relates to a method and apparatus for controlling operation of Light Emitting Diodes (LEDs) indicating electronic device state in a storage system configured to store and charge a plurality of electronic devices.

Storage systems, such as a computer carts or desktop trays, may include red green, blue, and other color LEDs that are used to show the status of the electronic devices connected to the storage system. Conventionally, LED operation was defined by the device manufacturer, such that the manufacturer would specify in hardware which LEDs should light up depending on the state of the electronic device. As an example, a manufacturer might specify that a red LED should light up when a device is first plugged into a port of the storage system, and that a green LED should light up when the device is fully charged.

However, different manufacturers might use different LED actions to indicate the same state. For example, a first manufacturer might specify that the red LED should blink when the device is first plugged into the port, and that the red LED should stop blinking and be lit constantly when the device is fully charged. A second manufacturer, by contrast, might use green LEDs to show that these device states, and use red LEDs to show other states, such that a device is being synchronized with a host computer. Where multiport charging systems from multiple vendors are deployed by a given customer, this lack of uniformity can cause confusion.

SUMMARY

All examples and features mentioned below can be combined in any technically possible way.

In some embodiments, the manner in which the LEDs are illuminated is able to be specified by the customer, such that the correlation between device event, LED action, LED color, and LED brightness, are able to be defined by the user. Accordingly, although the electronic device storage system may be pre-programmed to cause particular LED actions and colors to be used in connection with particular events, the LED actions and colors are user-customizable so that the user is not limited to the particular settings selected by the storage system manufacturer. In some embodiments, device/port information is received from the electronic devices as they connect to USB ports of the storage system and a mapping is used to correlate the location of a USB port where the electronic device connected to a set of LEDs on the storage system. As the state of the electronic devices changes, the custom-defined LED operational rules are applied on the LEDs of the storage system to cause the LEDs identified by the LED operational rules to be illuminated.

DETAILED DESCRIPTION

This disclosure is based, at least in part, on the realization that it would be desirable to enable a user to customize the manner in which LEDs are illuminated to indicate the state of electronic devices stored in an electronic device storage system 110. In some embodiments, once the LED operational rules are defined, the system applies the LED operational rules to LEDs associated with physical storage locations of the electronic devices, as the electronic devices undergo state changes while stored within the storage system.

Portable electronic devices 116 that are capable of storing and interacting with content such as music, video, and applications are ubiquitous. For example, electronic devices 116 such as the iPod™, iPad™, iPad Mini™, MacBook™, and MacBook Air™ are popular devices sold by Apple™ Inc., and are example types of electronic devices 116 that can be used to interact with digital content and run applications. Other types of electronic devices 116 are likewise available from other manufacturers, such as Samsung™, ACER™, Microsoft™, Google™, Dell™, etc., and although an implementation may be described at times in connection with electronic devices 116 available from Apple™, the invention is not limited to use with electronic devices 116 from any particular manufacturer. The term "electronic device", as used herein, is generic to include devices such as smartphones, tablet computers, laptop computers, and other handheld electronic devices that may be used to interact with content, run applications, and otherwise communicate and/or interact with other devices on a communication network.

Groups of electronic devices 116 are often maintained together to enable these devices to be provided to a group of users, for example in connection with education, training, or in a situation where synchronized content is desirable. For example, a museum may maintain a group of electronic devices 116 loaded with content relevant to a display in the museum. Likewise, schools may maintain groups of electronic devices 116 for use by students. Accordingly, systems for maintaining large numbers of electronic devices 116 have been developed. Storage systems 110 of this nature include computer carts, drawers, desktop open and closable trays, wall cabinets, table cabinets, lockers, and other physical structures that are designed to hold multiple electronic devices 116. For example, a storage system implemented as a computer cart may hold 20 electronic devices 116 per shelf, or may include one or more drawers each of which is configured to hold/store 20 or more electronic devices 116.

Storage systems 110 of this nature often include a multiport USB hub 115 or other type of computer network hub that the electronic devices 116 can connect to within the storage system 110, to enable the electronic devices to be charged while contained in the storage system. The multiport USB hub 115 also enables the electronic devices to have content synchronized with a host computer 100.

Figure 1:
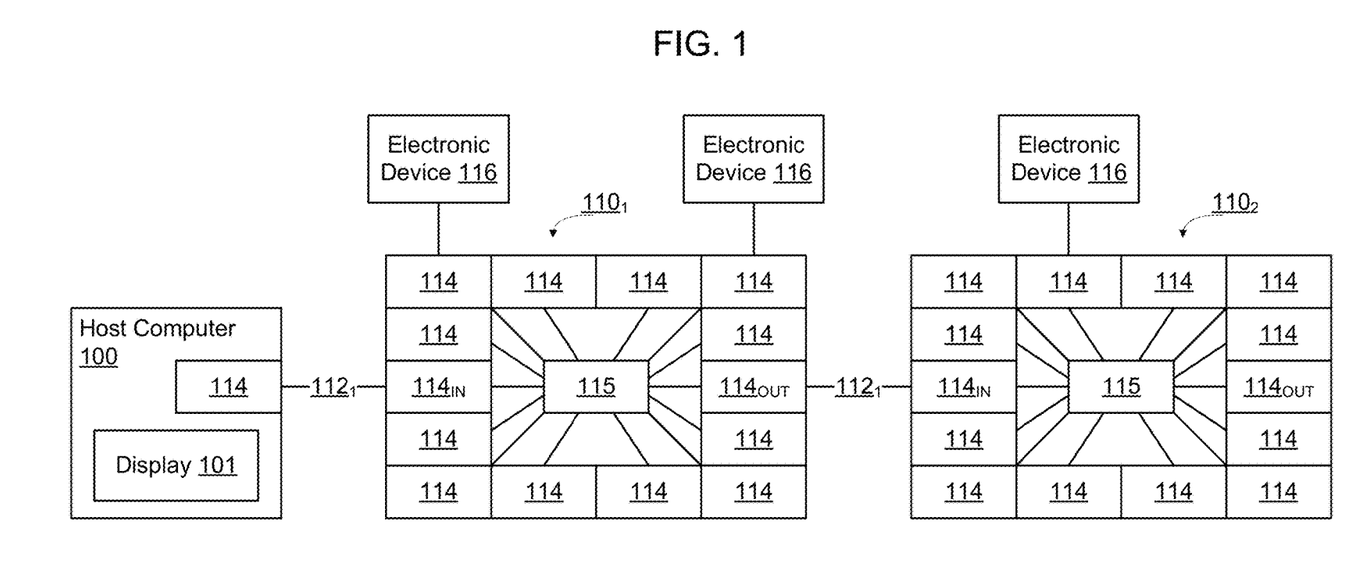
FIGS. 1 and 2 are functional block diagrams of example electronic device charging environments, according to some embodiments.
Figure 2:
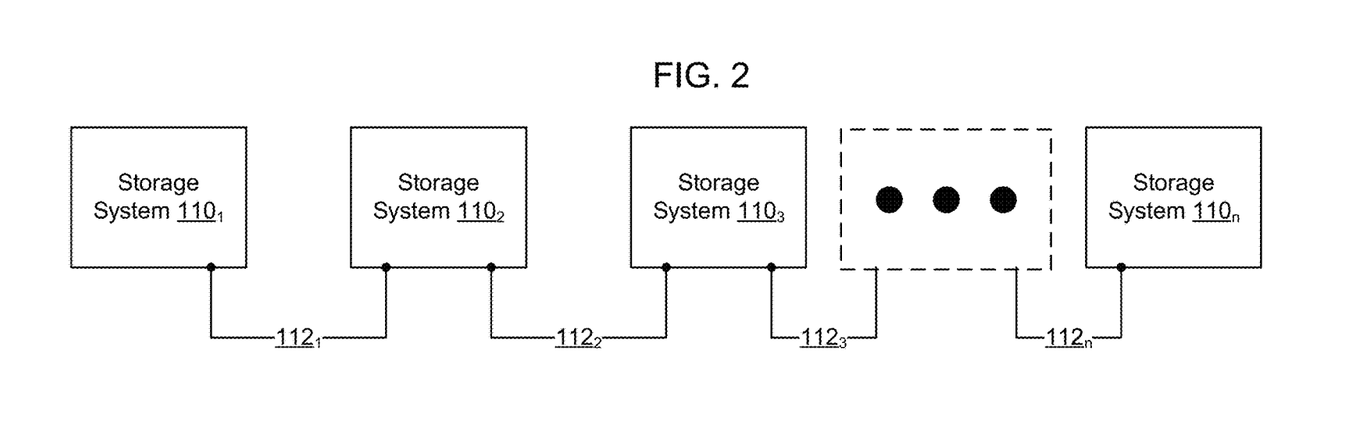

FIG. 1 is a functional block diagram of an example electronic device 116 charging environment, in which a host computer 100 is connected to a set of two storage systems $110_1$, $110_2$. In FIG. 1, host computer 100 has a USB port 114 that is connected via USB cable $112_1$ to a first of the storage systems $110_1$ at a USB port labeled $114_{IN}$. The first storage system $110_1$, in turn, has a USB port $114_{OUT}$ that is connected via a USB cable $112_2$ to a second of the storage systems $110_2$ at a USB port labeled $114_{IN}$. As shown in FIG. 2, in some embodiments multiple storage systems $110_1$-$110_n$ may be connected via USB ports 114 in this manner, to enable a single host computer 100 to communicate with devices 116 connected to USB ports 114 of the several interconnected storage systems 110. Although FIG. 2 shows a chain of storage systems $110_1$-$110_n$, the storage systems 110 may be interconnected in other network topologies as well, such as in a star topology, tree topology, or in another desired manner.

As shown in FIG. 1, each storage system 110 connected to host computer 100 has a multiport USB hub 115 including a plurality of USB ports 114 that are configured to provide charging power to electronic devices 116 connected thereto. In operation, the host computer 100 communicates with the electronic devices 116 over the multiport USB hub 115 to synchronize content to the electronic devices 116 while the devices are stored in the storage systems 110.

Figure 4:
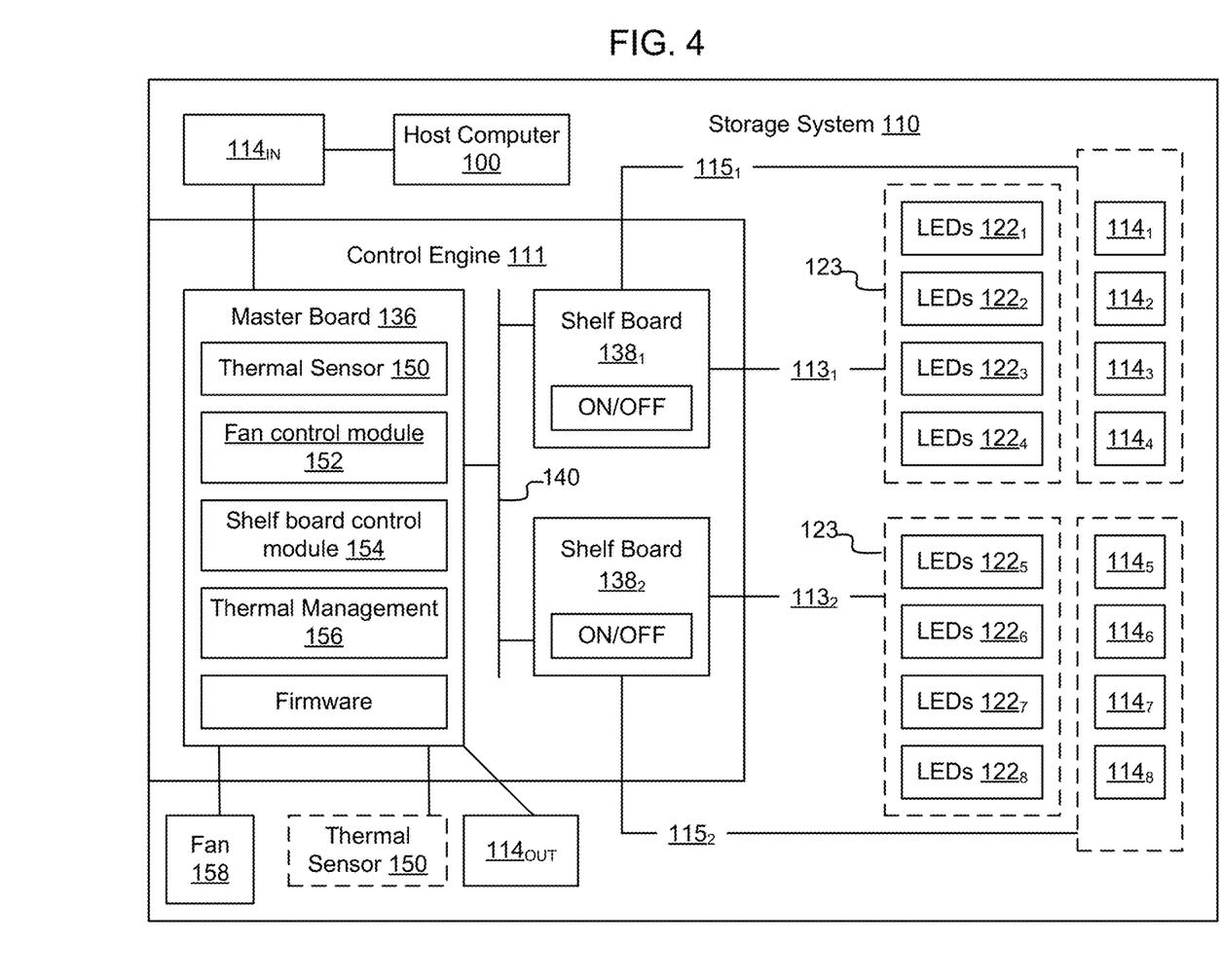

Although FIG. 1 shows the host computer as being implemented outside of the storage system 110, in some embodiments the host computer is housed in a compartment within one of the storage systems 110. For example, in some embodiments the host computer is an Apple iPad Mini that is housed in a compartment in storage system 110. An example embodiment of this nature is shown in FIG. 4, which is described in greater detail below.

Figure 3:
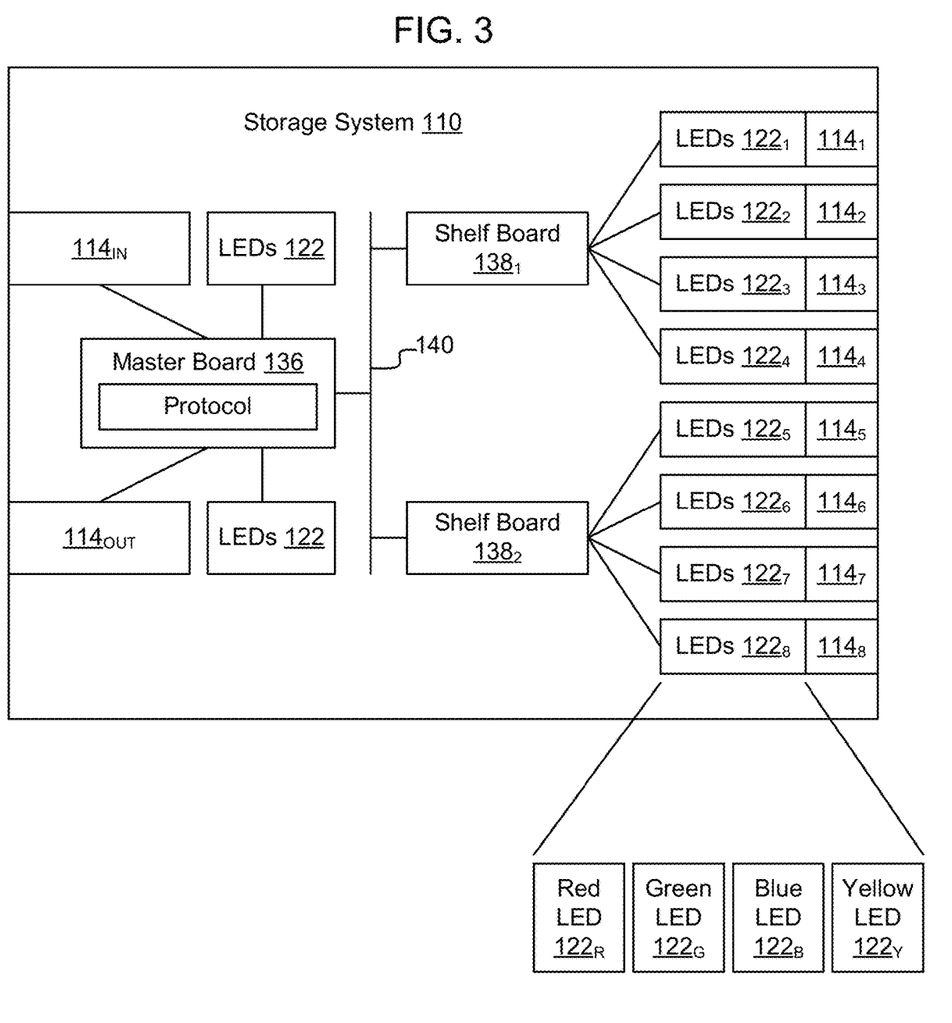
FIGS. 3 and 4 are functional block diagrams of example storage systems, according to some embodiments.

FIG. 3 is a functional block diagram of an example storage system 110. As shown in FIG. 3, in some embodiments the storage system 110 has a plurality of USB ports 114. Each USB port 114 has a plurality of LEDs 122 associated therewith. By turning the LEDs 122 on/off, causing different color LEDs 122 to be illuminated, blinking the LEDs 122, and varying the brightness of the LEDs, it is possible to visually indicate the state of the electronic devices 116 attached to the USB ports 114 associated with the controlled LEDs 122. As shown in FIG. 3, in some embodiments each set of LEDs 122 includes multiple individual colored LEDs, such as a red LED $122_R$, a Green LED $122_G$, a Blue LED $122_B$, and a Yellow LED $122_Y$. Other colors and other combinations of LEDs may be used. Likewise, multicolor LEDs or a variable color LEDs may be used depending on the implementation.

In the example shown in FIG. 3, the storage system 110 has a master board 136 and two shelf boards 138 connected by a bus 140. The master board 136 has a first USB port (labeled $114_{IN}$), and a second USB port (labeled $114_{OUT}$). The USB ports $114_{IN}$ and $114_{OUT}$ can be physically implemented on the master board 136 or connected to the master board 136. The first USB port $114_{IN}$ is configured to be connected to an upstream storage system 110 (a storage system closer to the host computer 100) or to host computer 100. Where host computer is implemented within the storage system 110 (see FIG. 4), the host computer 100, in some embodiments, connects to the master board using a USB cable 112, and is connected to the master board 136 via USB port $114_{IN}$. The master board optionally includes LEDs 122 configured to show the status of the USB ports $114_{IN}$ and $114_{OUT}$.

In some embodiments, the master board 136 acts as a gateway between the USB bus and a Controller Area Network (CAN) bus 140 implementing a CAN network within storage system 110. A CAN bus 140 is a robust bus designed to allow microcontrollers and devices to communicate with each other in applications without a host computer 100. The master board 136 receives instructions on the USB network from the host computer 100, and transfers data to the shelf boards 138 through the CAN bus 140.

FIG. 4 is a functional block diagram of another example storage system 110, in which the LEDs and USB ports are connected to a control engine 111 by cables 113, 115, respectively. In the embodiment shown in FIG. 4, the LEDs and USB ports 114 are not formed directly on the master board 136 and shelf boards 138 of control engine 111. For example, the USB ports may be disposed adjacent storage bays in the storage system 110 and the LEDs 122 may be disposed on an exterior surface of the storage system 110 at locations adjacent the storage bays. Likewise, multiple sets of LEDs may be associated with a given storage bay, for example a first set within the storage bay and a second set that is visible from outside of the storage system. FIG. 4 shows LEDs inside a dashed box 123 to indicate that optionally the LEDs may be formed on an LED strip. Accordingly, multiple embodiments are possible and the invention is not limited to the physical manner in which the LEDs are formed on the storage system.

Figure 6:
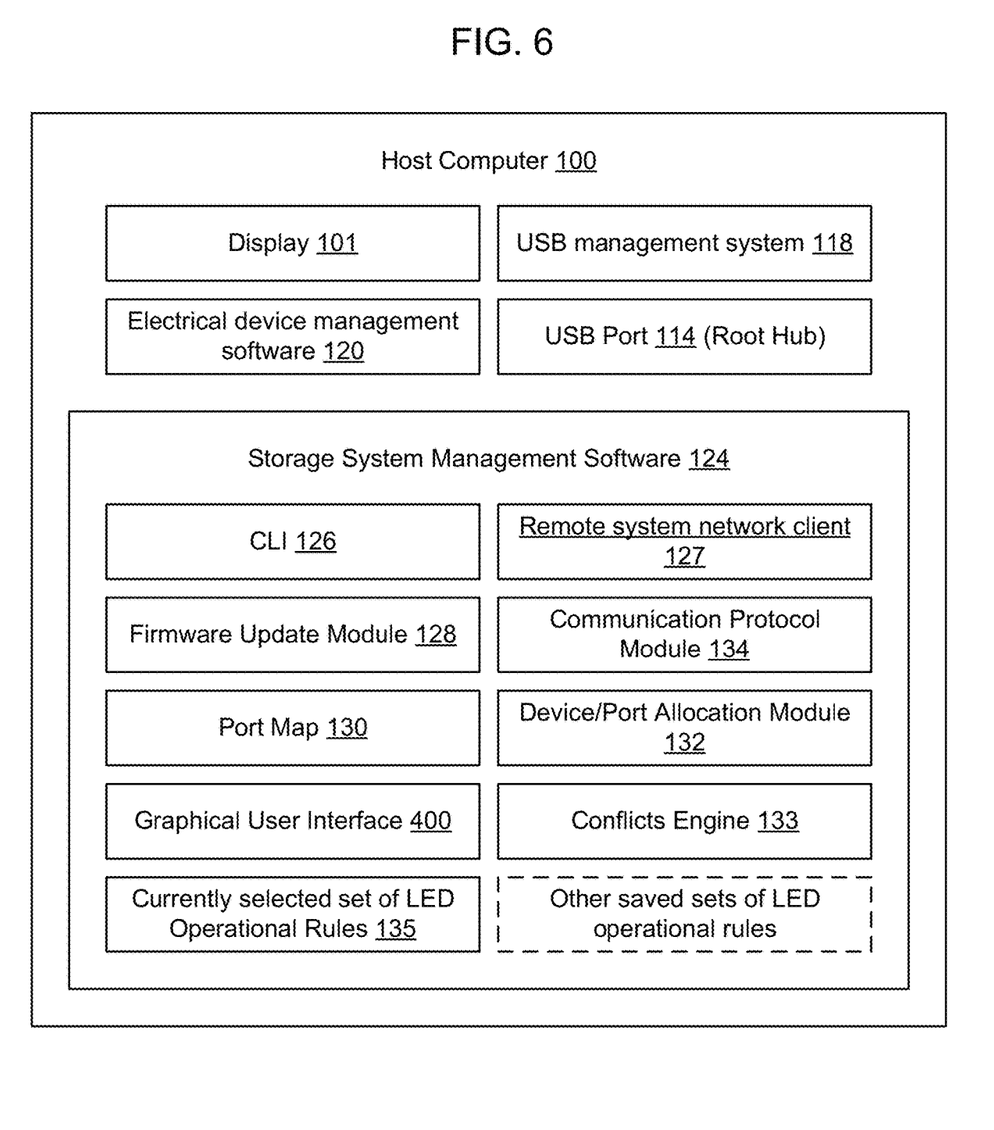
FIG. 6 is a functional block diagram of an example host computer for use in the electronic device charging environment of FIG. 1, according to some embodiments.

FIG. 6 is a functional block diagram of an example host computer 100. As shown in FIG. 6, in some embodiments the host computer 100 has a USB management system 118 and electronic device management software 120. USB management system 118 is a system component of any computer implementing the USB communication protocol on a USB communication bus. Briefly, as set forth in the various USB standards that have been promulgated over time, when a device connects to the USB bus by connecting to a USB port 114, the USB management system 118 detects that a new device has connected to the USB port 114 and requests that all connected devices identify themselves. Each device connected to the USB bus will respond, including the new device, which enables the host computer 100 to determine what type of device has just connected to the USB bus and install the correct drivers, to enable the host computer 100 to communicate with the newly connected device 116. As devices 116 connect to the USB ports 114 of the storage system 110, they are recognized by the host computer 100.

In some embodiments the host computer 100 has device management software 120 configured to synchronize content from the host computer 100 to the electronic devices 116 while the electronic devices 116 are connected to the storage system 110. In some embodiments, for use with devices running iOS, device management software 120 is Apple Configurator. Although an embodiment will be described herein in which the electronic device management software 120 is Apple Configurator and the electronic devices 116 are iOS-based devices, the invention is not limited in this regard as other types of device management software 120 may be used and other types of electronic devices 116 may likewise be used.

According to some embodiments, as shown in FIG. 6 and as discussed in greater detail below, the host computer 100 is provided with storage system management software 124 having a command line interface 126 that enables the electronic device management software 124 to specify operations of LEDs of the storage system 110. In some embodiments, the electronic device management software 120 provides instructions to the storage system management software 124 based on identification values associated with the electronic devices 116 that are connected to the storage system 110. The storage system management software 124 correlates electronic device IDs with physical locations within the storage system 110, and causes LEDs 122 associated with those locations to be adjusted according to the device state commands received from the electronic device management software 120. Since the electronic device management software 120 does not need to know the location of the electronic devices 116, and is able to simply specify states of the devices 116, no modification to the electronic device management software 120 is required regardless of what changes are made to the storage system 110. The storage system management software 124 translates state updates into LED states, and provides instructions to the storage system 110 to cause the LEDs 122 associated with the identified devices to be updated to reflect the device states.

In some embodiments, as shown in FIG. 6, storage system management software 124 is provided on host computer 100 to control LEDs 122 on storage system 110. In some embodiments, as device management software 120 takes action on the electronic devices 116 connected to storage system 110, the electronic device management software 120 instructs the storage system management software 124 of the current state of the electronic devices 116. Based on the current state information, the storage system management software 124 adjusts the LEDs 122 to correctly reflect the current state of the electronic devices 116 connected to USB ports 114.

As shown in FIG. 6, in some embodiments the storage system management software 124 includes a port map 130 identifying the configuration of the storage system 110 and which LEDs 122 are physically associated with which ports 114 in the USB tree. For example, in FIGS. 3 and 4, LEDs $122_1$-$122_8$ correspond respectively to USB ports $114_1$-$114_8$. On the host computer 100, the USB management system 118 and USB root hub (USB port 114 in FIG. 6) are integrated to form the root node of the USB tree. Additional hubs connect to the root node and form external hubs, each of which will act as an intermediary between peripheral devices and the host computer 100. An external hub has a single connection (an upstream port) to a higher level in the USB topology hierarchy, and numerous (typically between 4-7) downstream ports for connecting peripheral devices and other hubs to the USB tree. According to the current standard, up to 127 devices may be connected by cascading multiple hubs in the USB tree.

Each storage system 110 will have a fixed manner in which the hubs are arranged and, according to some embodiments, the storage system management software 124 knows the identity of the USB port 114 according to its location in the USB tree. The port map 130 correlates the USB port 114 with the sets of LEDs that are associated with the physical location of the USB port 114 in the storage system 110. Accordingly, in some embodiments the port map 130 represents a correlation between the identity of the USB port 114 in the USB tree and the LEDs 122 proximate the physical location of that USB port 114 on the storage system 110.

Different storage systems 110, with different numbers of USB ports 114, differently configured USB trees, and differently located LEDs 122, will need different port maps 130. According to some embodiments, a port map 130 specific for the type of storage system 110 connected to the host computer 100 is selected from a set of available port maps 130 to enable the storage system management software 124 to interact with different types of storage systems 110. Where multiple different storage systems are connected to the host computer, multiple maps may be obtained—one for each storage system in the set of storage systems. Where multiple storage systems are connected, the port maps similarly are cascaded to reflect the current state of the USB tree. In some embodiments, by including the multiple port maps 130 in storage system management software 124, it is possible to enable storage system management software 124 to control whatever storage system 110 is connected to the host computer. In some embodiments, the storage system management software 124 is configured to obtain the correct port map 130 or set of maps 130 from a centralized location, such as a cloud-based storage location using remote system network client 127.

Electronic device management software 120 communicates with the electronic devices 116 by addressing packets and other communications using an electronic device identifier. In some embodiments, to prevent the electronic device management software 120 from needing to know any details about the storage system 110, the storage system management software 124 has a command line interface 126 that allows device management software 120 to specify electronic device 116 state using this same device identifier. For example, if the electronic device management software 124 communicates with a particular electronic device 116 having device identifier (ID=27), the electronic device management software 120 can specify to the storage system management software 124 that the LEDs 122 associated with device ID=27 should be set to show that device ID=27 is currently charging and content is currently being synchronized with this device. The storage system management software 124 receives this instruction via CLI 126 and sets the operational state of the LEDs 122 associated with the USB port 114 connected to device ID=27 to reflect the current state of that device, as specified by the electronic device management software 120.

In some embodiments, as described herein, the electronic device management software 120 specifies LED 122 control using device ID information. Accordingly, as shown in FIG. 6, in some embodiments the storage system management software 124 has a device/USB port allocation module 132 that collects and maintains information about which electronic devices 116 are connected to which USB ports 114. As the states of the electronic devices change, the storage system management software 124 uses the current device state LED operation rules 135 to selectively turn on/off the various LEDs of the storage system 110 in accordance with the LED operation rules.

There are several ways that the storage system management software 124 can collect information about which devices 116 are connected to which USB ports 114. In some embodiments, during enumeration when the electronic device 116 first connects to the USB bus, the electronic device 116 will provide identifying information that is collected by the USB management system 118 to enable the host computer 100 to communicate with the electronic device 116. In some embodiments, the electronic device/port allocation module 132 of storage system management software 124 listens to the electronic device 116 enumeration on the USB bus, determines the location of the newly connected electronic device 116 in the USB tree, and uses this information to populate device/port allocation module. In another embodiment, the location of the electronic device 116 in the electronic device registry is used to determine the location of the electronic devices 116 in the USB tree. In another embodiment, the storage system management software 124 invokes a function on the USB bus to cause all devices on the USB tree to identify themselves. The storage system management software 124 thereby collects identifiers of the electronic devices 116 and the locations of the electronic devices 116 in the USB tree. However the information is collected, the serial number or other device ID that is used by the host computer 100 to identify the electronic devices 116 can then be associated with the particular port 114 in storage system 110 and is stored in device/port allocation module 132. Whenever an electronic device state change occurs, as detected by the CLI 126, the storage system management software 124 generates and transmits an instruction to the storage system 110 to adjust the LED 122 associated with the USB port where that electronic device 116 is connected to the storage system 110.

By abstracting the storage system 110 from the electronic device management software 120, and allowing the electronic device management software 120 to specify the state of the electronic devices 116 it is controlling using the same device ID that it uses to communicate with the electronic devices 116, the electronic device management software 120 is able to interoperate with a large number of different types of storage systems 110 without requiring modifications to the electronic device management software 120. For example, if a storage system 110 that is configured as a 12 port charging tray is initially connected to the host computer 100, and then a second 12 port charging tray is serially connected to the first 12 port charging tray, the storage system management software 124 handles the coordination of controlling all of the various storage systems 110 that are connected to the host computer 100 without requiring the electronic device management software 120 to be modified in any way. Similarly, if there is a hardware update on the storage system 110, or if the type of storage system 110 connected to the host computer 100 changes, none of these types of events require any modification or adjustment to the electronic device management software 120.

In some embodiments, the storage system management software 124 has a communication protocol module 134 configured to generate and output commands to the storage system 110. Commands from the communication protocol module 134 are transmitted on the USB bus to the storage system 110 to the master board 136 that implements the instructions embedded in the commands.

In some embodiments, the storage system management software 124 uses a proprietary protocol to communicate between the host computer 100 and the master board 136 on the storage system 110. In some embodiments the protocol enables commands to be sent to the storage system 110 hardware to control operation of the LEDs of the storage system 110. Example LED operations include turning a red, yellow, blue, green, or other color LED 122 ON, select a combination of color LEDs to turn ON, adjust a color of a multi-color LED, turn an LED 122 OFF, cause an LED 122 to blink, or take numerous other actions. In some implementations with variable intensity Red, Green, Blue and/or other color LEDs 122, a blended amount of light may be specified to cause the set of LEDs 122 to generate a custom color.

In some embodiments, when the storage system management software 124 is started, it sends a Get_Device_Parameters command to the attached storage system 110 to get parameters associated with the hardware implementing the master board 136 and shelf boards 138. The returned parameters from the master board 136 enable the storage system management software 124 to know what type of storage system 110 is connected to the host computer 100 on the USB bus, and provide details about the firmware 157 of the storage system 110. In some embodiments the Get_Device_Parameters command is used periodically, such as once each second, to act as a communication check between the storage system management software 124 and the storage system 110.

In some embodiments, the Get_Device_Parameters command is an 8 byte command, in which the first byte has a value specifying that it is a valid command start byte, the second byte is a value that identifies the command as a Get_Device_Parameters command, and the third byte is used to specify to the storage system 110 how often the storage system 110 should reply with its device parameters. The other remaining five bytes are currently not used.

As shown in FIG. 6, in some embodiments the storage system management software 124 has a firmware update module 128 configured to enable firmware updates for the storage systems 110 to be managed through storage system management software 124. Whenever a new firmware update for one or more of the storage systems 110 is published, the new firmware update is distributed to the storage system management software 124 running on host computer 100. The firmware update module 128 of the storage system management software 124 uses the firmware update to apply a new firmware image onto the master board 136 and shelf boards 138 of the storage system 110, to implement the firmware update. By including a firmware update module 128 in the storage system management software 124, it is possible to update firmware 157 of a storage systems 110 in a distributed manner using the processing power inherent in the host computer 100, without requiring intelligence to implement firmware updates in the storage system 110.

Figure 5:
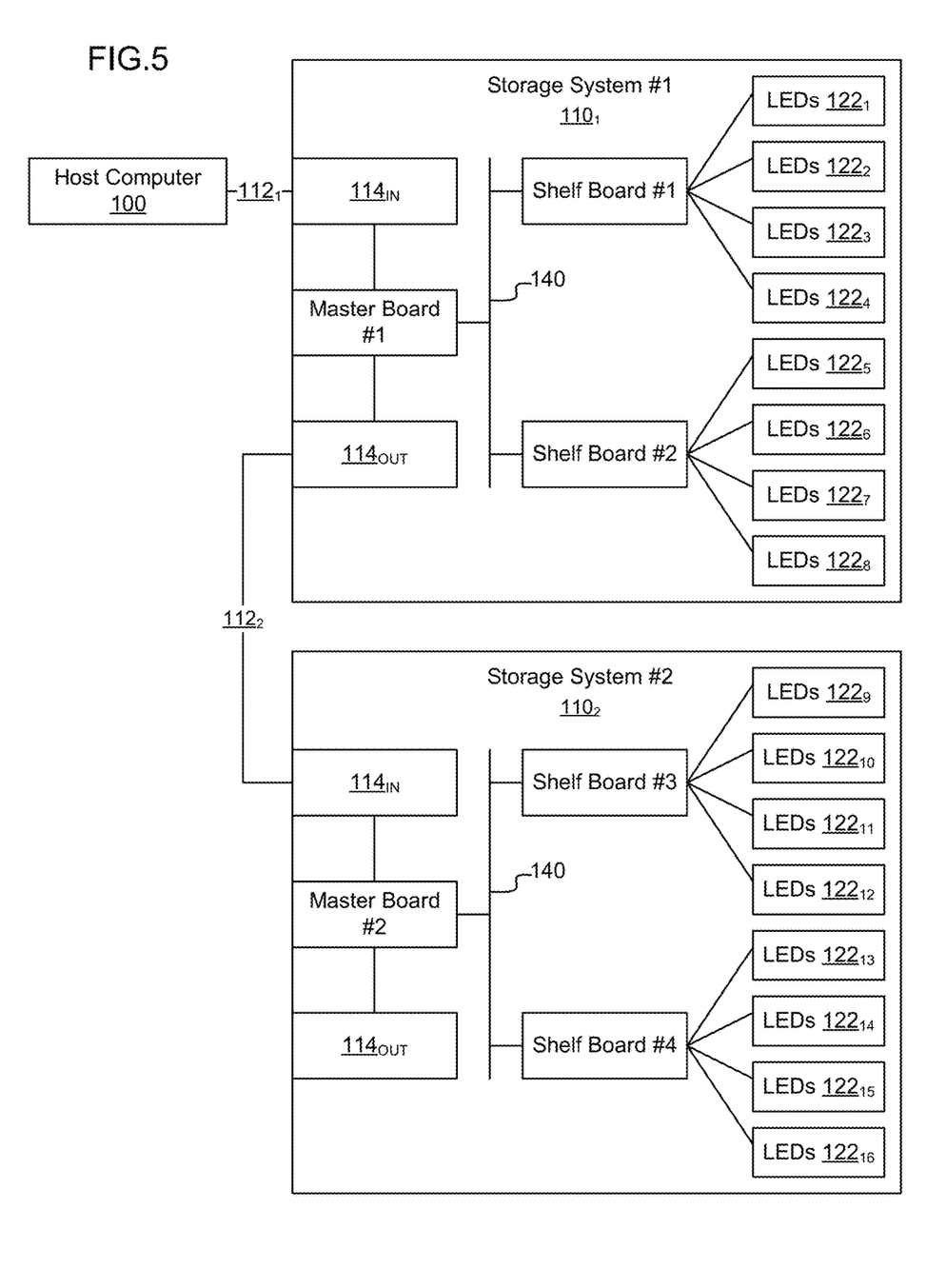
FIG. 5 is a functional block diagram of two example storage systems interconnected to a host computer in a daisy-chain fashion in the electronic device charging environment of FIG. 1, according to some embodiments.

In some embodiments, when a firmware update is to be implemented, the firmware update is first implemented on the shelf boards 138, and once the shelf boards 138 have been updated the firmware update is implemented on the master board 136. Where the storage systems 110 are daisy chained, as shown in FIG. 5, the firmware 157 of storage system 110 farthest from the host computer 100 in the USB tree is updated first, and then the firmware update process moves to shelfs/master controllers closer to the host computer 100 in the USB tree. In some embodiments, as shown in FIG. 5, when more than one storage system 110 is connected to the host computer 100, the master boards 136 of the storage systems 110 are consecutively numbered and the shelf boards 138 within the set of storage systems 100 are likewise consecutively numbered. For example, in the embodiment shown in FIG. 5, storage system $110_1$ has a master board that is numbered master board #1. Storage system $110_1$ has first and second shelf boards numbered shelf board #1 and shelf board #2. The master board of storage system $110_2$ is numbered master board #2. Storage system $110_2$ has first and second shelf boards numbered shelf board #3 and shelf board #4. Although only two storage systems 112 are shown daisy-chained in this manner, in other embodiments third, fourth, or more storage systems 110 may be used. When applying a firmware update, the storage system management software 124 works backward to first apply the firmware update to shelf board #4, then to shelf board #3, and then to master board #2. Once the firmware of storage system $110_2$ has completed, the storage system management software 124 will begin the firmware update on storage system $110_2$ by first updating the firmware of shelf board #2, then applying the firmware update to shelf board #1, and then applying the firmware update to master board #1. By applying the firmware updates first to the farthest away components, and then applying the firmware updates to the nearer components, it is possible to ensure that the firmware update module is able to communicate with the components of the set of storage systems $110_1$, $110_2$ as the firmware update is incrementally applied.

Figure 7:
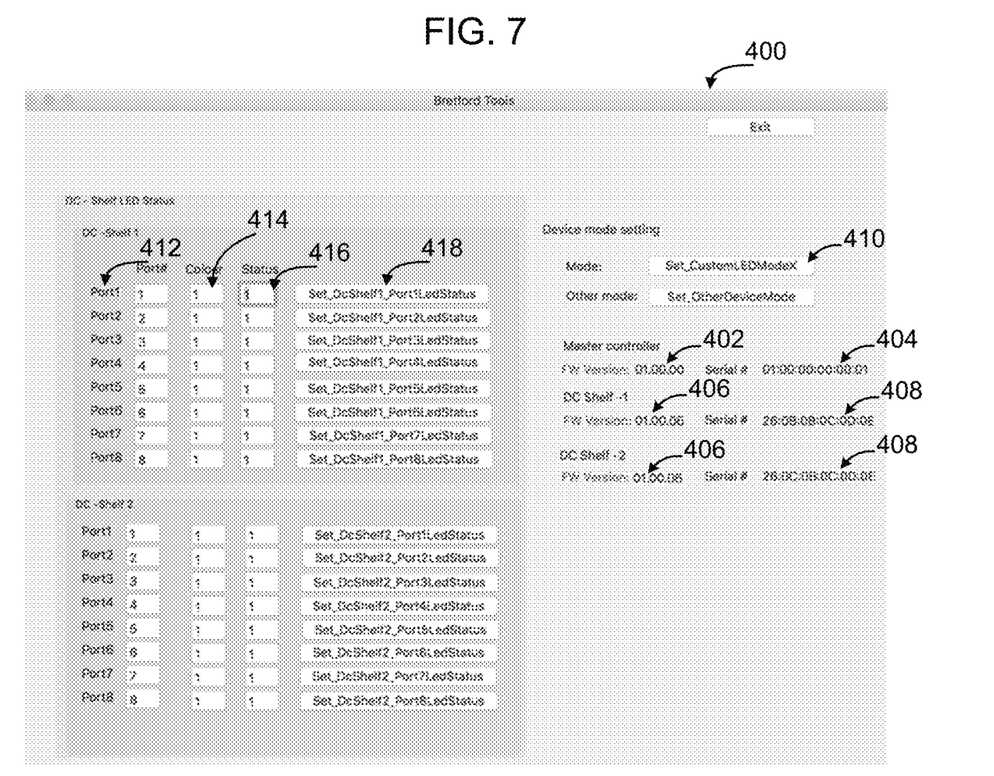
FIGS. 7-9 are functional block diagrams showing functionality of an example user interface of a storage system management software, according to some embodiments.

FIG. 7 is a screen shot 400 of an example user interface of storage system management software 124 that is generated by storage system management software 124 and output on a display 101 of host computer 100. As shown in FIG. 7, in some embodiments the user interface 400 includes a field 402 to display the firmware version of the master board 136 and a field 404 to display the serial number of the master board 136. The user interface likewise includes fields 406 to display the provides the firmware version of each of the shelf boards 138 (labeled DC Shelf-1 and DC Shelf-2 in FIG. 7), and fields 408 to display the serial number of each of the shelf boards 138.

When the storage system 110 receives a Get_Device_Parameters command, it responds using an Update_Device_Status_Information command. The storage system 110 will respond using the Update_Device_Status_Information command each second or at another interval depending on the value specified in the third byte of the Get_Device_Parameters command. The Update_Device_Status_Information command carries information about the storage system 110, including information about the master board 136 and each of the shelf boards 138. In some embodiments, the Update_Device_Status_Information command is used to provide information to the storage system management software 124 that the storage system management software uses to populated fields 402, 404, 406, and 408.

In some embodiments, as shown in FIG. 7, the storage system management software 124 enables the user to set a custom LED 122 mode to convert the LED 122 state into a custom LED 122 mode state after system powerup. In some embodiments, the default mode is Default_LED_State. The storage system 110 may be placed into a mode where control of individual LEDs 122 or groups of LEDs 122 may be directly controlled by clicking the Set_CoustomLEDModeX button 410 on the user interface 400 shown in FIG. 7. When button 410 is selected, the storage system management software 124 sends a Set_Custom_LED_ModeX command to the master board 136 via USB Human Interface Device (HID) communication.

In some embodiments, the Set_Custom_LED_ModeX command is an 8 byte command, in which the first byte is the Valid Command Start Byte, the second byte is a value that indicates that the command is intended to set the LED 122 operation mode, and the third byte specifies that the LED 122 operation mode is Custom_LED_ModeX.

Once the storage system 110 has been instructed to enter into custom LED 122 mode, individual LEDs 122 may be controlled via the user interface of the storage system management software 124. For example, as shown in FIG. 7, in some embodiments the user interface 400 has a row 412 for each USB port 114 of each shelf board 138. If the master board 136 has USB ports 114 that are connectable to electronic devices 116, the user interface 400 includes a row 412 for each of these USB ports 114 as well. A user can select which color LED 122 should be used for that port in area 414, set the status for the LED 122 (Off/On/Blink) in area 416, and then click on a button 418 to apply the changes to the particular LEDs 122 associated with that port.

In some embodiments, a Set_LED_Status command is used to change the status of LEDs 122 associated with particular ports in the storage system 110. In some embodiments, the Set_LED_Status is an 8 byte command, in which the first byte is the Valid Command Start Byte, the second byte identifies the shelf board 138, the third byte identifies the USB port 114 on that shelf board, the fourth byte identifies the LED 122 color selected in area 414, and the fifth byte specifies the status (Off/On/Blink) selected in area 416.

In some embodiments, the storage system management software 124 is configured to send commands to the storage system 110 to configure port status, request that the storage system 110 send its port map 130, and other administrative commands to enable the storage system management software 124 interact with the storage system 110. For example, in some embodiments the storage system management software 124 can generate and transmit a command to the master board 136 to switch the master board 136 or one of the shelf boards 138 into boot mode.

As described in greater detail herein, in some embodiments the storage system management software 124 has full control over the LEDs 122 of the storage system 110 such that the operation of the LEDs 122 on the storage system 110 can be controlled directly by the storage system management software 124. This is in contrast to previous implementations in which the storage system 110 itself would detect the status of the electronic devices 116 connected to the USB ports 114 and set the operational status of the corresponding LED 122 based on the status detected by the storage system 110. By providing software-based control over the LEDs 122 via the storage system management software 124, it is possible to enable a user to use different LED 122 indications than is natively provided by the storage system 110 in its Default_LED_Mode.

For example, assume a first storage system 110 has been configured, as its Default_LED_Mode, that a red blinking LED 122 should be used to indicate that a device is connected to the USB port 114 and is charging. However, a user may find this counter-intuitive and may prefer that a green blinking LED 122 should be used to indicate that a device is connected to the USB port 114 and is charging. For example, the user may have another storage system 110 that is an earlier model or that was made by another manufacturer, which uses a green blinking LED 122 to indicate that a device is connected to the USB port 114 and is charging.

Previously, the LED 122 operation was dictated solely by the storage system 110 so this is not something that was able to be customized by the user. However, by providing full control over LED 122 operation via the storage system management software 124, it is now possible using the system described herein for the user to customize the LED 122 operation of the storage system 110. Thus, in the example described above, using the storage system management software 124, a user can specify that green blinking LEDs 122 are to be used whenever a device is connected to a USB port 114 and is charging, to thereby customize the manner in which the LEDs are used to indicate state of electronic devices connected to the storage system.

Figure 8:
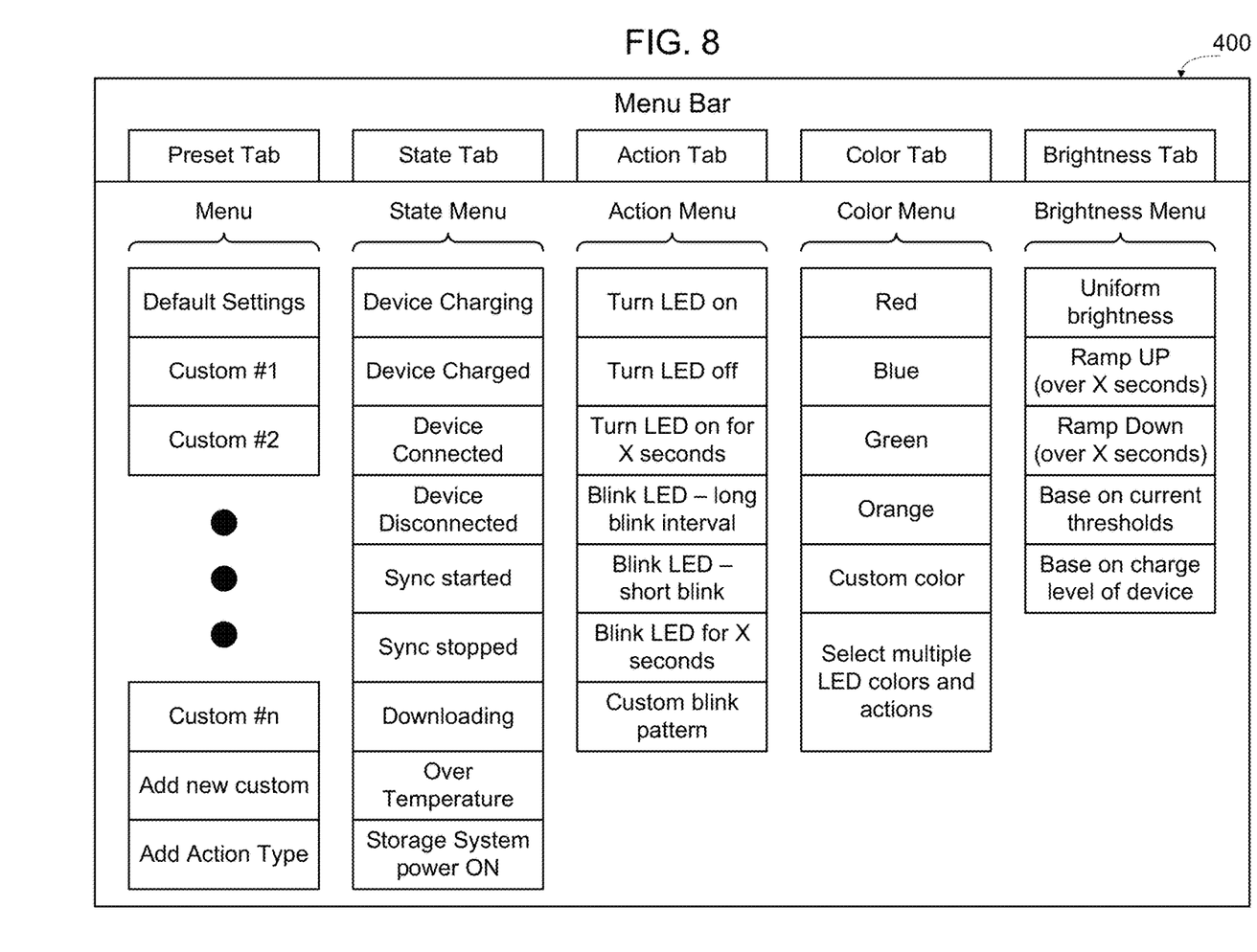

FIG. 8 is a functional block diagram showing some functionality of an example user interface 400 of a storage system management software 124, according to some embodiments. The example shown in FIG. 8 is not intended to show the exact layout of the user interface, but rather is intended to convey some of the functionality that might be implemented the storage system management application user interface. In particular, FIG. 8 shows a selection of tabs labeled "Preset", "State", "Action", "Color", and "Brightness". The tabs are user-selectable. FIG. 8 also shows example menus of selections that may be provided to the user when the corresponding tab is selected. Different tabs, different menu options, and different ways of organizing the options may be used depending on the embodiment.

As shown in FIG. 8, in some embodiments, the graphical user interface 400 of the storage system management software 124 has a number of features that enable the user to access functionality of the storage system management software 124 to customize the manner in which LEDs of the storage system 110 are illuminated. As used herein, the term "LED operation rule" is used to refer to a particular combination of LED action, color, and brightness that should be applied to a set of LEDs of the storage system in connection with a particular device state. In embodiments where the LED brightness is not a parameter that can be specified, for example if the brightness is a fixed value, the term "LED operation rule" is used to refer to a particular combination of LED action and LED color that should be applied to a set of LEDs of the storage system in connection with a particular device state.

In some embodiments, as shown in FIG. 8, the graphical user interface 400 has a first tab labeled "preset tab" through which the user can select to apply a default set of LED operation rules to the LEDs of the storage system, one of a number of previously defined custom sets of LED operation rules (labeled custom #1-custom #n in FIG. 8), or through which the user can define a new custom set of LED operation rules.

To enable the user to specify custom sets of LED operation rules, in some embodiments the graphical user interface 400 also includes a state tab, an action tab, a color tab, and a brightness tab. These four tabs are used to define rules that specify how the LEDs should be operated in dependence on the state of the electronic devices 116. To create an LED operation rule, in some embodiments the state tab is used to select a device state that might occur on an electronic device. For example, the menu entry "device charging" can be selected from the state menu. Once the device state type has been selected, the behavior of the LEDs for that device state can be specified by selecting entries from the action menu, color menu, and brightness menu. For example, the user could select that when the device state is "Device Charging," the LED action should be "Turn LED on", the color of the LED should be "Red" and the brightness should be "Uniform Brightness". The user can select any combination of actions, colors, and brightness, for any event. In some embodiments, particular actions, color, and brightness selections require further input from the user. For example, if the user clicks on the action labeled "turn LED on for X seconds", the user is prompted to input a value for the amount of time (in seconds), that the LED should be turned on.

In some embodiments, the storage system management software 124 includes a conflicts engine 133 (see FIG. 6) that detects whether the same LED operation rule has been selected for two or more device states. If the user has already selected a particular combination of action, color, and brightness for a different device state, in some embodiments the conflicts engine will not allow the combination to be used a second time, to prevent multiple device states from having the same LED light pattern. For example, in some embodiments, if the user has previously selected a particular combination of action, color, and brightness for a different device state, when the user selects an action and color, the previously used brightness type will be grayed out so that the user is not able to select that particular trio of for two separate device states. In other embodiments, this rule is relaxed and the conflicts engine 133 is configured to provide a notice to the user to alert the user of the conflict, but the user is able to use the same LED operation rule for multiple device states if that is intended.

Figure 9:
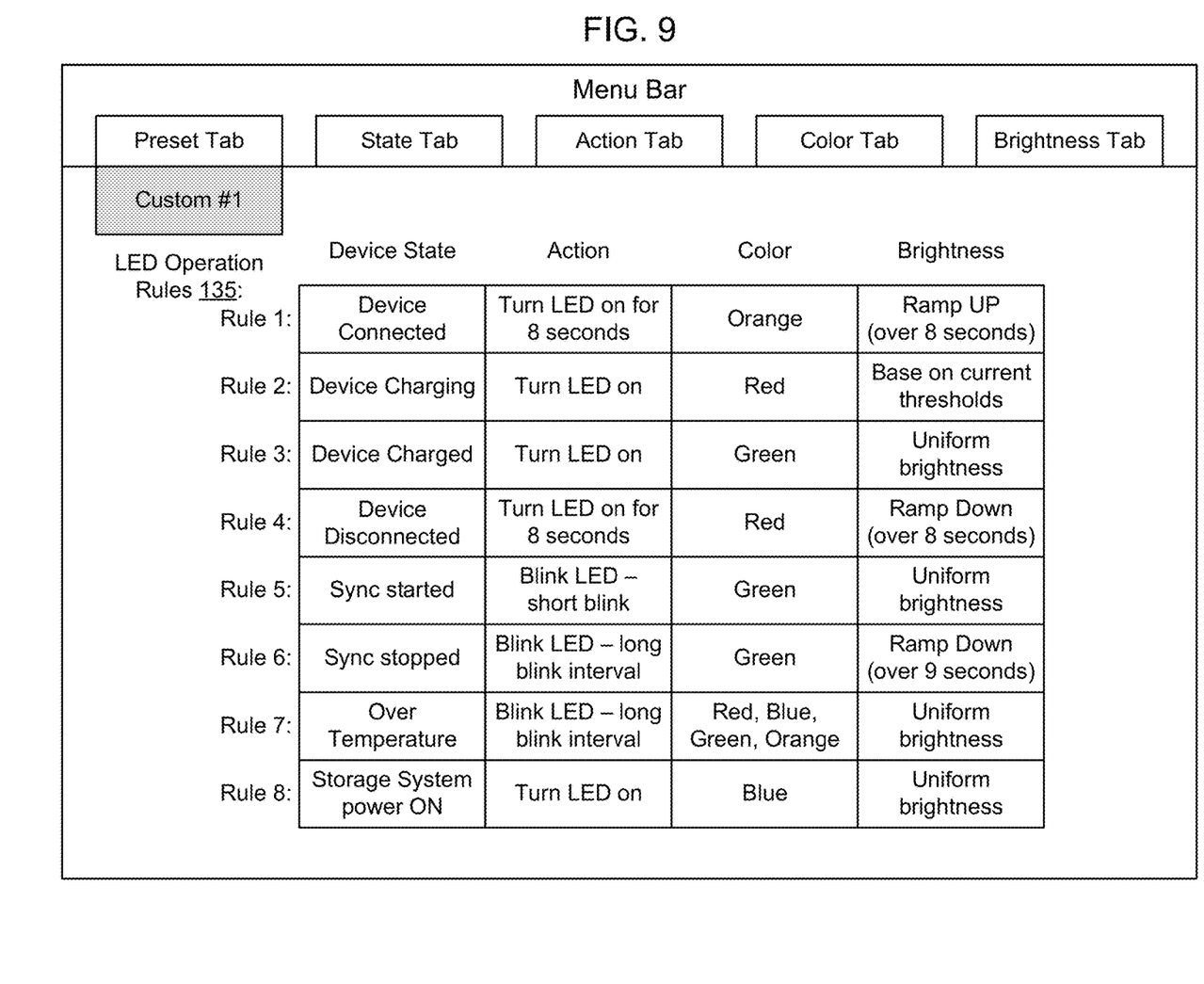

FIG. 9 shows an example set of LED operation rules 135 that a hypothetical user has created and saved as custom ruleset #1. As shown in FIG. 9, when the user selects the custom #1 tab under the preset tab, the LED operation rules associated with that custom LED operation ruleset are displayed. Thus, for example, rule 1 of the custom ruleset is that when device state="device connected" the Orange LED should be turned on for 8 seconds, and the LED brightness is set to ramp up over the 8 second interval.

Optionally, if the user elects to edit the set of rules of custom ruleset #1, the user can then save the ruleset to make permanent changes to the ruleset, or can save the amended ruleset as a new custom ruleset.

In some embodiments, the preset tab includes custom rulesets that are preconfigured to cause the storage system to mimic LED lighting patterns used by various storage system manufacturers. For example, one custom ruleset may be preconfigured based on LED lighting patterns used by Bretford Manufacturing in connection with its laptop computer carts. Another custom ruleset may be preconfigured based on LED lighting patterns used by one or more other computer cart manufacturers. In this manner, if a particular customer has storage systems produced by more than one manufacturer, the user can quickly and easily change the way in which the LEDs are used to show device state, by causing the LED lighting patterns of multiple storage system manufacturers to conform with each other.

Once the LED operational rules are defined, and one of the sets of LED operational rules 135 has been selected to be applied to a particular storage system 110, the storage system management software 124 uses the selected LED operational rules 135 to instruct the storage system to activate/deactivate LEDs on the storage system 110 as state changes occur on the electronic devices contained within the storage system 110.

Although an implementation has been described in which the physical location of the port is determined, and the LEDs 122 associated with that location are able to be adjusted, in some embodiments such as where the storage system 110 is a set of individually lockable lockers, the storage system management software 124 is also configured to take other actions on the storage system 110. For example, the storage system management software 124, in some embodiments, is configured to unlock an access door for the locker compartment where the electronic device 116 is stored, turn on a light inside the locker compartment where the electronic device 116 is stored, or take other action on the compartment where the electronic device 116 is stored.

As shown in FIG. 4, in some embodiments host computer 100 is included inside the storage system 110, for example in a compartment on the back or bottom of the storage system 110. To prevent the host computer 100 from overheating, in some embodiments the storage system 110 includes a thermal sensor 150, fan control module 152, shelf board control module 154, and thermal management process 156. Example thermal sensors include negative temperature coefficient thermistors, resistance temperature detectors, thermocouples, and semiconductor-based sensors. The thermal sensor 150 may be formed on the master board 136 as shown in FIG. 4 or may be implemented separate from the master board (as shown by the thermal sensor 150 in dashed lines in FIG. 4) and connected to the master board 136. Although an example will be described in which the thermal management process 156 is implemented on the master board 136, in some embodiments the temperature readings from the thermal sensor 150 are transmitted by master board 136 to the storage system management software 124, and the storage system management software 124 implements the thermal management process 156 described below.

Figure 10:
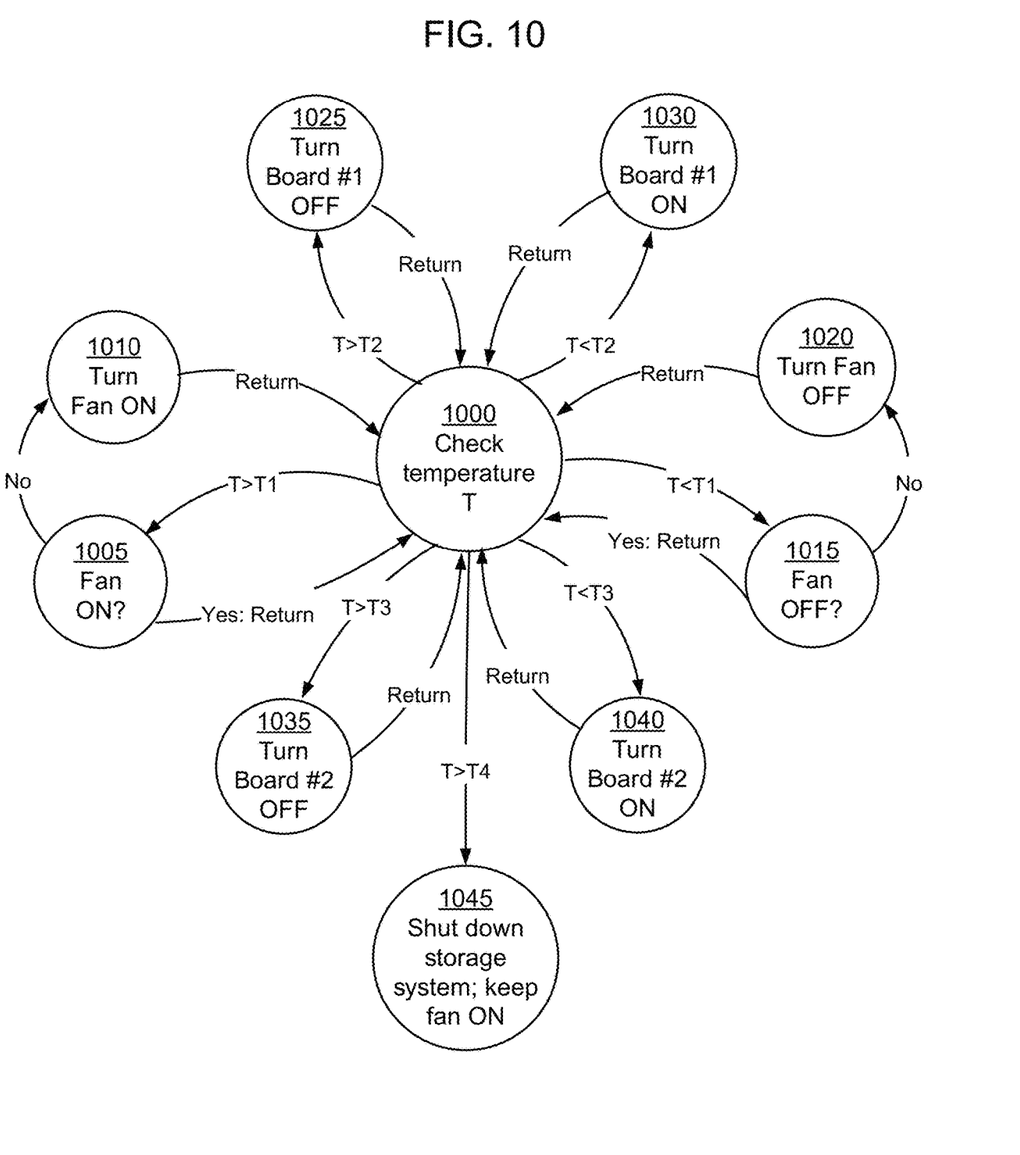
FIG. 10 is a state diagram of an example thermal management process for a storage system, according to some embodiments.

In some embodiments, the thermal management process is implemented as a state machine as shown in FIG. 10. Other ways of implementing the thermal management process may be used as well, and the invention is not limited to an implementation that utilizes a state machine to implement the thermal management process 156.

As shown in FIG. 10, in some embodiments the thermal management process 156 periodically checks the temperature T of the storage system 110 as detected by thermal sensor 150 (state 1000). The temperature check may be implemented continuously, or periodically, for example every 5-15 seconds. The particular manner and frequency with which the temperature T is checked (state 1000) may depend on the particular implementation. Once the temperature T has been determined, in some embodiments the thermal management process 156 compares the determined temperature T against a set of threshold values. Although the comparators "less than" and "greater than" are used to describe conditions for transitions between states of the thermal management process 156, some of the comparators may be "greater than or equal to" or "less than or equal to" depending on the implementation.

If the measured temperature T is determined to be above a first temperature threshold (T>T1), the temperature management process 156 moves to state 1005, in which a determination is made if the fan 158 is currently ON. If the fan is currently ON, the thermal management process returns to state 1000. If the fan 158 is not currently ON in state 1005, the process moves to state 1010 in which the fan 158 is turned ON. The process then moves back to state 1000.

If the temperature is determined to be less that the first temperature threshold T1 (T<T1), the thermal management process moves to state 1015, in which a determination is made if the fan 158 is currently OFF. If the fan 158 is currently OFF, the thermal management process returns to state 1000. If the fan 158 is not turned OFF in state 1015, the process moves to state 1020 in which the fan 158 is turned OFF. The process then moves back to state 1000.

If the temperature T is determined to be above a second temperature threshold T2 (T>T2), the thermal management process transitions to state 1025 in which a first of the shelf boards 138 (board #1) is turned OFF. The thermal management process then returns to state 1000. If the temperature subsequently drops below the second temperature threshold T2 (T<T2), the thermal management process transitions to state 1030 in which board #1 is turned ON. The thermal management process then returns to state 1000.

If the temperature T continues to increase after board #1 has been turned OFF, and the measured temperature T exceeds a third temperature threshold T3 (T>T3), the thermal management process transitions to state 1035 in which a second of the shelf boards 138 (board #2) is turned OFF. If the temperature subsequently drops below the third temperature threshold T3 (T<T3), the thermal management process transitions to state 1040 in which board #2 is turned ON. The thermal management process then returns to state 1000.

If there are more than two shelf boards 138 connected to the master board 136, the thermal management process 156 serially turns of each of the shelf boards 138 to try to cause the interior temperature of the storage system 110 to be reduced to an acceptable temperature range.

Optionally, if the temperature T exceeds a fourth temperature threshold T4, and there are no additional shelf boards 138 to be turned off, the thermal management process 156 transitions to state (1045), in which power is turned off to all components of the storage system 110 except the fan 158, which remains ON. To transition out of this state 1045, in some embodiments, the storage system 110 is required to undergo a manual power cycle in which power to the storage system 110 is switched off, and then switched back on. Preventing the interior of the storage system 110 from exceeding a predetermined temperature, e.g. threshold T4, reduces the risk that an embedded host computer 104 will be forced to operate in an environment that is dangerously warm and could damage the host computer 104.

Implementations of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. In addition, the instructions may be implemented in a high-level procedural and/or object-oriented programming language, and/or in assembly/machine language. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible non-transitory computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A thermal regulation system for a storage system having a master board, at least two shelf boards, a fan, and an integrated host computer, the thermal regulation system comprising:
    a thermal sensor;
    a fan control module;
    a shelf board control module; and
    a thermal management process, the thermal management process being configured to:
    periodically check a current temperature of an interior of the storage system using the thermal sensor;
    compare the current temperature to a first temperature threshold, and if the current temperature is greater than the first temperature threshold, cause the fan control module to turn the fan ON;
    if the current temperature is above the first temperature threshold, compare the current temperature with a second temperature threshold, and if the current temperature is greater than the second temperature threshold, cause the shelf board control module to turn a first of the shelf boards off;
    if the current temperature is above the second temperature threshold, compare the current temperature with a third temperature threshold, and if the current temperature is greater than the third temperature threshold, cause the shelf board control module to turn a second of the shelf boards off;
    wherein the thermal management process is further configured such that if the current temperature is above the third temperature threshold, the thermal management process is configured to compare the current temperature with a fourth temperature threshold, and if the current temperature is greater than the fourth temperature threshold, cause the master board to shut down while keeping power supplied to the fan.

2. The thermal regulation system of claim 1, wherein the integrated host computer is connected to the master board by a USB cable and physically resides within a compartment of the storage system.

3. The thermal regulation system of claim 1, wherein the thermal management process is implemented as a process in the host computer.

4. The thermal regulation system of claim 1, wherein the thermal management process is implemented in control logic on the master board.

* * * * *